(12) United States Patent
Saga

(10) Patent No.: US 7,113,208 B1
(45) Date of Patent: Sep. 26, 2006

(54) IMAGE PROCESSING APPARATUS, IMAGE PROCESSING METHOD AND RECORDING MEDIUM

(75) Inventor: Yoshihiro Saga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/253,995

(22) Filed: Feb. 22, 1999

(30) Foreign Application Priority Data

Feb. 24, 1998 (JP) ................................ 10-042365

(51) Int. Cl.
*H04N 5/76* (2006.01)

(52) U.S. Cl. ................................................ 348/231.99

(58) Field of Classification Search ........... 348/231.99, 348/231.9, 231.6; 386/33; 711/105, 106
See application file for complete search history.

(56) References Cited

U.S. PATENT DOCUMENTS

| | | | | |
|---|---|---|---|---|
| 5,016,107 A | * | 5/1991 | Sasson et al. ............. | 348/231.1 |
| 5,146,592 A | * | 9/1992 | Pfeiffer et al. .............. | 345/807 |
| 5,253,214 A | * | 10/1993 | Herrmann ................... | 365/233 |
| 5,448,310 A | * | 9/1995 | Kopet et al. ................ | 348/699 |
| 5,805,300 A | * | 9/1998 | Fukushima ................. | 358/404 |
| 5,808,952 A | * | 9/1998 | Fung et al. ................. | 365/222 |
| 5,826,035 A | * | 10/1998 | Hamada et al. ............. | 709/247 |
| 5,894,446 A | * | 4/1999 | Itou ........................... | 365/222 |
| 6,052,129 A | * | 4/2000 | Fowler et al. .............. | 345/620 |
| 6,205,524 B1 | * | 3/2001 | Ng ............................. | 711/151 |
| 6,330,645 B1 | * | 12/2001 | Harriman ................... | 711/151 |

* cited by examiner

*Primary Examiner*—David Ometz
*Assistant Examiner*—James M. Hannett
(74) *Attorney, Agent, or Firm*—Cowan, Liebowitz & Latman, P.C.

(57) ABSTRACT

An image capture apparatus having an image capture unit, a memory, an image compression unit, an image display unit, a control unit, a refresh control unit, and an arbitration unit adapted to assign a higher priority to a process of providing image data from the image capture unit to the memory than a process of refreshing the memory and a process of accessing the memory by the control unit, to assign a higher priority to a process of refreshing the memory and a process of accessing the memory by the control unit than to a process of compressing image data stored in the memory by the image compression unit, to assign a higher priority to a process of providing image data from the memory to the image display unit than a process of refreshing the memory and a process of accessing the memory by the control unit, and to assign a higher priority to a process of refreshing the memory than a process of accessing the memory by the control unit.

9 Claims, 5 Drawing Sheets

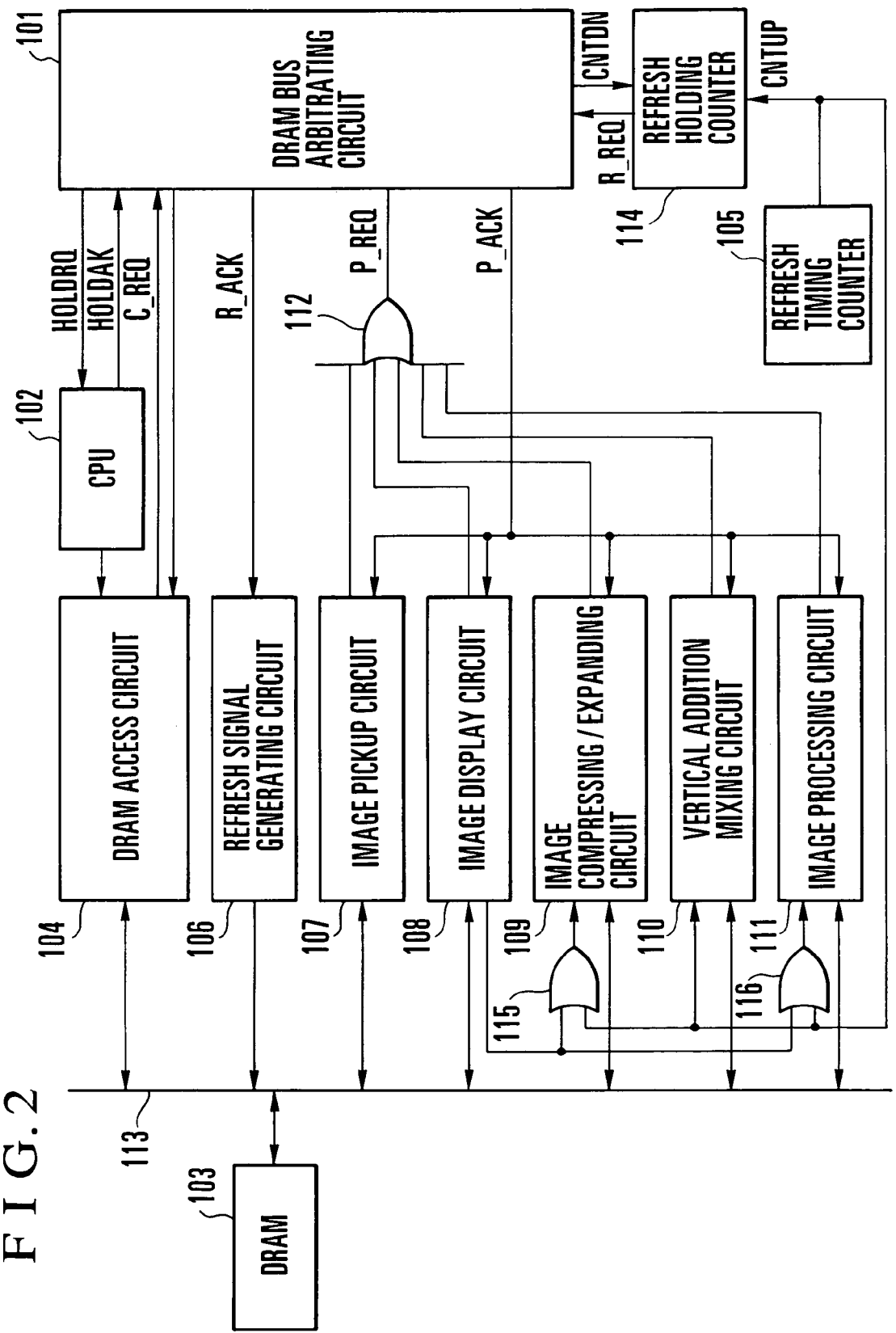
F I G. 2

IMAGE PROCESSING APPARATUS, IMAGE PROCESSING METHOD AND RECORDING MEDIUM

BACKGROUND OF THE INVENTION

1. Field of the Invention

The present invention relates to an image processing apparatus, an image processing method and a computer-readable recording medium or the like, and, more particularly, to an image processing apparatus, an image processing method and a recording medium which are suitable for application to an electronic camera or the like.

2. Description of Related Art

FIG. 1 is a block diagram schematically showing the construction of a general digital electronic camera. In the digital electronic camera shown in FIG. 1, a CPU 102 (made of a microprocessor) serves to control the entire system of the digital electronic camera. A DRAM 103 is a memory element called a dynamic RAM (hereinafter referred to as the DRAM) into or from which to write or read image data, camera system programs, work data for the CPU 102 and the like. The DRAM 103 needs to perform an operation called refresh by a predetermined number of times for a predetermined time period so that the DRAM 103 can retain the contents stored therein. A block 104 is a DRAM access circuit for converting the signal outputted from the CPU 102 into a DRAM control signal. A refresh signal generating circuit 106 generates a refresh signal by producing a pulse to be outputted to a RAS (row address strobe) clock line and CAS (column address strobe) clock line which constitute DRAM control lines.

An image pickup circuit 107 is a circuit for converting an image picked up by a CCD image pickup element (not shown) into digital image data and recording the digital image data on the DRAM 103. An image display circuit 108 is a circuit for transferring image data from the DRAM 103 to a liquid crystal display panel, or converting the image data into a video signal and outputting the video signal to an external video output. An image compressing/expanding circuit 109 is a circuit for compressing image data to reduce the amount of information thereof or expanding compressed image data into data having the amount of information that is equivalent to the amount of information of the original image data. A vertical addition mixing circuit 110 is a circuit for adding vertically adjacent lines together to enable video processing of image data for two fields which are outputted from an interlaced CCD image pickup element. An image processing circuit 111 is a circuit for performing the processing of changing a size including the aspect ratio of image data on the DRAM 103, rotating an image, or changing the position of an image in the DRAM 103. A DRAM bus 113 includes a data bus, a DRAM address bus and the DRAM control lines.

The operation of the digital electronic camera shown in FIG. 1 will be described below.

First of all, the image pickup operation of the digital electronic camera will be described below. Image data formed on the CCD image pickup element is read from the image pickup circuit 107 and is temporarily recorded in the DRAM 103. Then, the vertical addition mixing circuit 110 adds together vertically adjacent lines of the image data on the DRAM 103, and again records the result in the DRAM 103. Then, the image pickup circuit 107 converts the added image data stored in the DRAM 103 into luminance color-difference image data, and again records the result in the DRAM 103. The image processing circuit 111 optimizes the aspect ratio of the luminance color-difference image data. Finally, the image data is compressed by the image compressing/expanding circuit 109, and the picked-up image is recorded as a file on a recording medium (not shown) via the DRAM bus 113.

The image display operation of the digital electronic camera will be described below. First of all, an image file is read from the recording medium by the image compressing/expanding circuit 109, and is expanded into image data in the DRAM 103. The image display circuit 108 reads the image data from the DRAM 103, and outputs the image data to a monitor (not shown). Thus, the image display operation is achieved.

To normally effect the above-described image pickup and display processing, it is necessary that the DRAM 103 be correctly refreshed in the aforesaid processing cycle and that use rights to the data bus or the DRAM 103 be correctly assigned to each image processing, refresh and the CPU 102.

The DRAM 103 needs to perform an operation called refresh by not less than a predetermined number of times for a predetermined time period. It is assumed herein that the DRAM 103 needs 1,024 refreshes per 128 msec (milliseconds).

However, the image pickup circuit 107 and the image display circuit 108 operate at horizontal and vertical periods. If refresh is performed during an image pickup operation, the image pickup operation is interrupted during the refresh. This leads to the problem that a picked-up image partly lacks data and no correct image can be obtained.

To avoid this problem, the refresh of the DRAM 103 is performed during the blanking periods of an image signal in each of an image pickup operation and an image display operation. The image pickup circuit 107 outputs a horizontal synchronizing signal. Several-microsecond periods before and after the horizontal synchronizing signal are horizontal blanking periods, during which data read from the CCD image pickup element do not appear. During such a horizontal blanking period, the DRAM 103 is refreshed because the image pickup circuit 107 does not need to record data in the DRAM 103.

When the horizontal synchronizing signal is "1", the refresh signal generating circuit 106 generates a refresh signal of one cycle and outputs this refresh signal to both the RAS and CAS clock lines of the DRAM bus 113. It is assumed here that the period of the horizontal synchronizing signal outputted from the image pickup circuit 107 is 85 μsec (microseconds). If one refresh is performed each time one horizontal synchronizing signal is outputted, 1,506 refreshes per 128 msec are performed. This satisfies the prescribed condition of the DRAM 103, i.e., 1,024 refreshes per 128 msec.

The horizontal synchronizing signal is coupled to the hold request input of the CPU 102. While the CPU 102 is receiving the horizontal synchronizing signal, the CPU 102 temporarily stops its operation to avoid access to the DRAM 103 during refresh.

The image display circuit 108 operates in synchronism with clocks and horizontal synchronizing signals outputted from the image pickup circuit 107. The image display circuit 108 starts reading display image data several microseconds after the reception of a horizontal synchronizing signal. Assuming that the number of horizontal data of a picked-up image is equal to the number of horizontal data of a display image, the display of one horizontal line is completed before the next horizontal synchronizing signal appears. Since refresh during an image display operation is performed in synchronism with the horizontal synchronizing signal similarly to refresh during an image pickup operation, the refresh during the image display operation is performed during the horizontal blanking periods thereof.

When the image compressing/expanding circuit 109 receives a compression command, the image compressing/expanding circuit 109 compresses the data stored in the DRAM 103 into a predetermined size. The time period required for such compression processing ranges from several hundred milliseconds to several seconds according to image sizes. It is, therefore, necessary to interrupt the compression processing and refresh the DRAM 103 at intervals of a predetermined time period.

When the horizontal synchronizing signal becomes "1", the refresh signal generating circuit 106 causes the DRAM 103 to start refreshing and outputs a signal indicating that refresh is being performed. When the image compressing/expanding circuit 109 receives this signal, the image compressing/expanding circuit 109 interrupts its processing. During this time, the refresh signal generating circuit 106 outputs a refresh signal to the DRAM 103. If the horizontal synchronizing signal again becomes "0", the signal indicating that refresh is being performed again becomes "0" and the image compressing/expanding circuit 109 restarts the compression processing.

Similarly to the image compressing/expanding circuit 109, the vertical addition mixing circuit 110, the image processing circuit 111 and other image processing circuits operate while interrupting their processing during refresh.

However, the above-described general digital electronic camera has the following problems.

During the operation of a process such as the above-described image processing, the CPU 102 is held and temporarily stops its operation, so that the CPU 102 is not able to perform any operation other than the process. For example, during image compression, the CPU 102 is not able to perform the processing of displaying characters such as "COMPRESSING" on a liquid crystal display panel or the processing of blinking a system busy indicator lamp which indicates that it is impossible to start an image pickup operation.

In addition, since the unit time of refresh is one horizontal blanking period, refresh is performed by the number of times which is greater than the actually necessary number of times. In the aforesaid example, 1,506 refreshes per 128 msec are performed, which are approximately 1.5 times as large as the actually necessary number of refreshes per unit time, i.e., 1,024 refreshes per 128 msec. As a result, power consumption increases. Particularly during sleep, since the consumption of power due to refresh occupies a large proportion of the energy consumption of the entire camera, the above-described fact is not preferable.

Furthermore, since each of the image compressing/expanding circuit 109, the vertical addition mixing circuit 110 and the image processing circuit 111 receives refresh requests by a large number of times, the frequency with which its process is interrupted becomes higher, and the processing time period of the process becomes longer. This impairs the operability of the digital electronic camera.

During sleep or image display, since no image pickup operation needs to be performed, it is preferable to stop the supply of power to the image pickup circuit 107. However, in the above-described example, since refresh timing is generated on the basis of the operation of the image pickup circuit 107, it is impossible to stop the image pickup circuit 107 in any situation. Accordingly, it is impossible to achieve a sufficient reduction in power consumption.

BRIEF SUMMARY OF THE INVENTION

It is, therefore, an object of the present invention to solve the above-described problems.

Another object of the present invention is to provide an image processing apparatus and method as well as a computer-readable recording medium all of which are capable of reliably executing various kinds of image processing while reliably performing a refresh operation.

To achieve the above object, in accordance with one aspect of the present invention, during the execution of a refresh process for storage means which stores image data, a first process using the storage means and a second process using the storage means, access to the storage element is arbitrated so that the first process takes priority over the refresh process and the refresh process takes priority over the second process.

Another object of the present invention is to provide an image processing apparatus and method as well as a computer-readable recording medium all of which are capable of reducing the refresh rate of storage means to the minimum necessary rate to reduce power consumption and to enhance the speeds of other processes.

To achieve the above object, in accordance with another aspect of the present invention, during the execution of a refresh process for refreshing storage means which stores image data and a process for processing the image data by performing writing of the image data into the storage means or reading of the image data from the storage means, whether to synchronize the refresh process with an image is specified according to the contents of the image data processing process.

Another object of the present invention is to provide an image processing apparatus and method as well as a computer-readable recording medium all of which enable a CPU or the like to efficiently execute image processing as well as processing other than refresh.

To achieve the above object, in accordance with another aspect of the present invention, during switching from a refresh process for refreshing storage means which store image data to a process for processing image data by performing writing of the image data into the storage means or reading of the image data from the storage means, another operation is controlled by using the storage means.

To further achieve the above objects an image capture apparatus is provided comprising an image capture unit adapted to capture image data, a memory adapted to store the image data captured by the image capture unit, an image display unit adapted to display an image using the image data stored in the memory, a control unit adapted to control the image capture apparatus, and a refresh control unit adapted to refresh memory. The image capture apparatus also includes at least one of an image compression unit adapted to compress the image data stored in the memory, an image processing unit adapted to rotate the image data stored in the memory and an image processing unit adapted to change an image size of the image data stored in the memory.

The image capture apparatus further includes an arbitration unit adapted to assign a higher priority to a process of providing image data from the image capture unit to the memory than a process of refreshing the memory and a process of accessing the memory by the control unit. The arbitration unit is also adapted to assign a higher priority to a process of refreshing the memory and a process of accessing the memory by the control unit than to at least one of a process of compressing image data stored in the memory by the image compression unit, a process of rotating image data stored in the memory by the image processing unit and a process of changing an image size of image data stored in the memory by the image processing unit. The arbitration unit is further adapted to assign a higher priority to a process of providing image data from the memory to the image display unit than a process of refreshing the memory and a process of accessing the memory by the control unit and to assign a higher priority to a process of refreshing the memory than a process of accessing the memory by the control unit.

The above and other objects, features and advantages of the present invention will become apparent from the following detailed description of preferred embodiments of the present invention, taken in conjunction with the accompanying drawings.

BRIEF DESCRIPTION OF THE SEVERAL VIEWS OF THE DRAWING

FIG. 2 is a block diagram schematically showing the construction of a digital electronic camera according to one embodiment of the present invention;

DETAILED DESCRIPTION OF THE INVENTION

A preferred embodiment of the present invention will be described below in detail with reference to the accompanying drawings.

FIG. 2 diagrammatically shows the construction of a digital electronic camera according to the preferred embodiment of the present invention.

Figure 1:
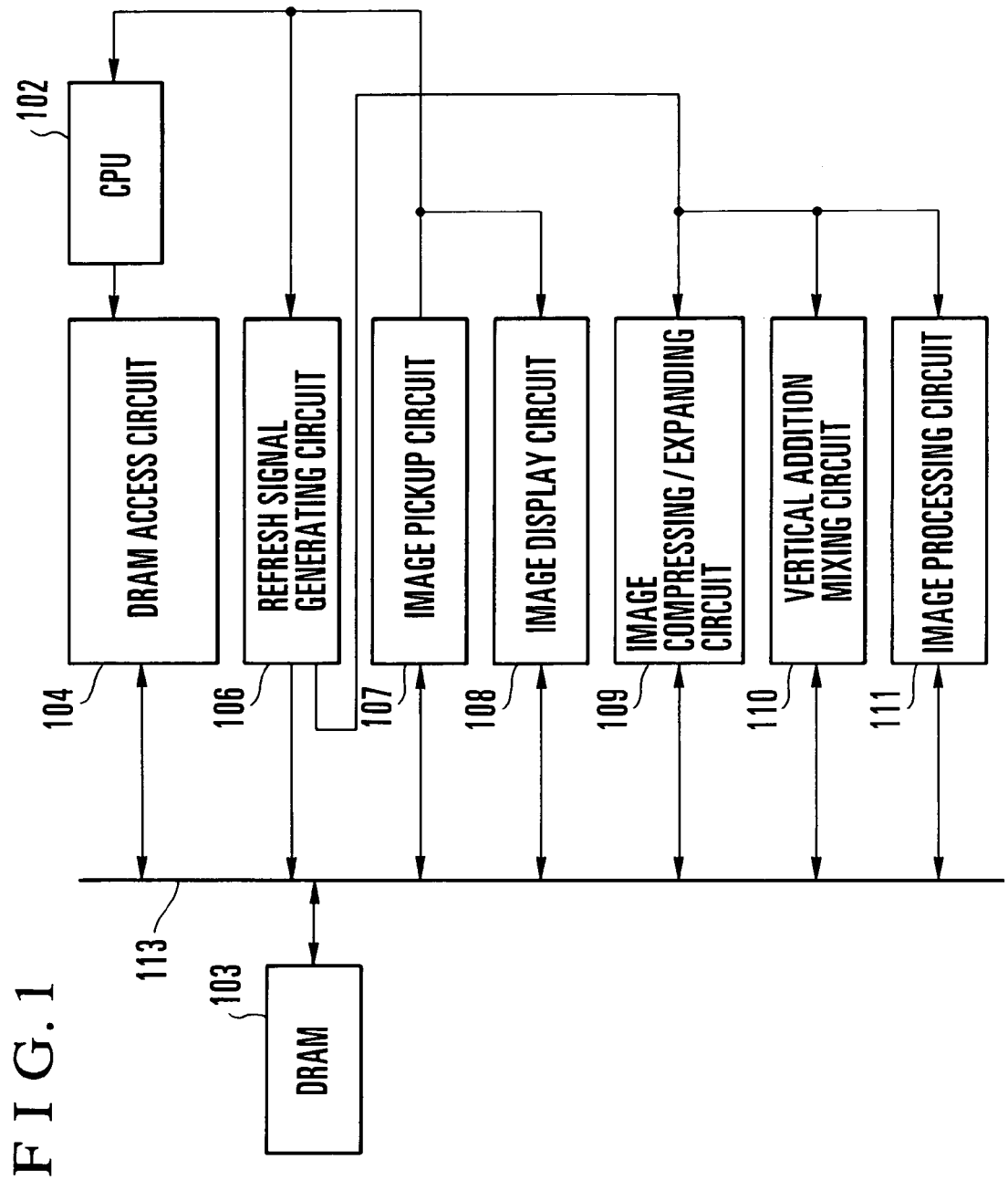
FIG. 1 is a block diagram schematically showing the construction of a general digital electronic camera.

The digital electronic camera shown in FIG. 2 includes a DRAM bus arbitrating circuit 101 for arbitrating accesses to a DRAM bus by a CPU 102, a process circuit and a refresh circuit both of which will be described later, a refresh timing counter 105 for generating one pulse at intervals of a predetermined time period, OR circuits 112, 115 and 116, a refresh holding counter 114, the CPU 102 and other constituent elements 103, 104, 106 to 111 and 113. Since the constituent elements 102 to 104, 106 to 111 and 113 have been previously described with reference to FIG. 1, the description thereof is omitted for the sake of simplicity. The DRAM 103, in which a program for the CPU 102 is also stored, constitutes a computer-readable storage medium according to the present invention.

The operation of the digital electronic camera according to the preferred embodiment of the present invention will be described below. The digital electronic camera is arranged to execute processes including an image pickup process, an image display process, an image compressing/expanding process, a vertical addition mixing process and an image processing process. First of all, the operations of the respective processes and the operation of the DRAM bus arbitrating circuit 101 will be described below. Each of the process circuits 107 to 111 is classified into a process circuit of the type A shown in FIG. 3 or a process circuit of the type B shown in FIG. 4.

Figure 3:
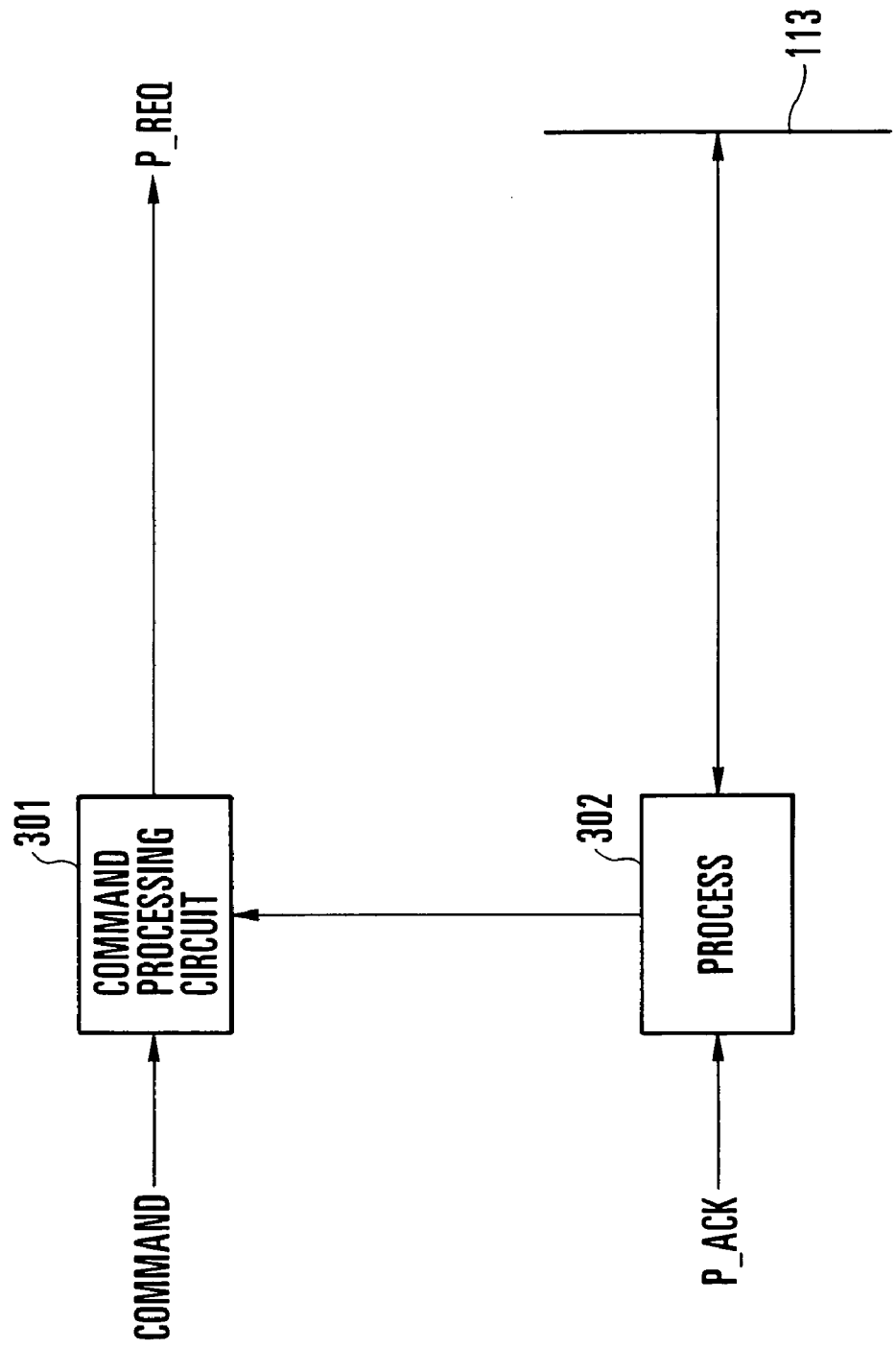
FIG. 3 is a block diagram showing the essential portion of a first type of process circuit incorporated in the electronic camera shown in FIG. 2.

Referring to the process circuit of the type A shown in FIG. 3, when a command processing circuit 301 receives a process start command from the CPU 102, the command processing circuit 301 generates a process request signal P_REQ indicative of "1". This process request signal P_REQ passes through the OR circuit 112 and is inputted into the DRAM bus arbitrating circuit 101. When the DRAM bus arbitrating circuit 101 receives the process request signal P_REQ indicative of "1", the DRAM bus arbitrating circuit 101 requests a refresh or a CPU access to release an access right to the DRAM bus 113. If neither the refresh nor the CPU access has occurred, the DRAM bus arbitrating circuit 101 directly proceeds to the next step. Although not show in FIG. 2, a connection line for transmission or reception of commands is disposed between the CPU 102 and each of the circuits 107 to 111.

If the DRAM bus 113 is released, the DRAM bus arbitrating circuit 101 gives a DRAM bus use right to a process circuit 302 and then generates a signal P_ACK indicative of "1" which means that the DRAM bus use right is given to the process circuit 302. When the process circuit 302 receives the signal P_ACK indicative of "1", the process circuit 302 starts a predetermined process. Upon the completion of the predetermined process, the process circuit 302 resets the process request signal P_REQ to "0". When the DRAM bus arbitrating circuit 101 receives the process request signal P_REQ indicative of "0", the DRAM bus arbitrating circuit 101 returns to a standby state and waits until a DRAM access, a refresh or a process by the CPU 102 again requests a DRAM bus use right.

The process circuit of this type A, once it starts a process, executes the process in preference to any request from another circuit. Each of the image pickup circuit 107 and the image display circuit 108 is realized as the process circuit of the type A. When an image pickup operation or an image display operation is to be started, the corresponding one of the image pickup circuit 107 and the image display circuit 108 outputs a process request signal P_REQ indicative of "1" and acquires an access right to the DRAM bus 113. Upon the completion of the operation of picking up or displaying an image for one line, the corresponding circuit 107 or 108 resets the process request signal P_REQ to "0" and releases the DRAM bus 113.

Thus, a refresh operation is prevented from being started during the operation of picking up or displaying an image for one line, whereby an image can be picked up or displayed without interruption. A refresh is performed after the release of the DRAM bus 113, i.e., during a horizontal blanking period. The refresh operation will be described later.

Figure 4:
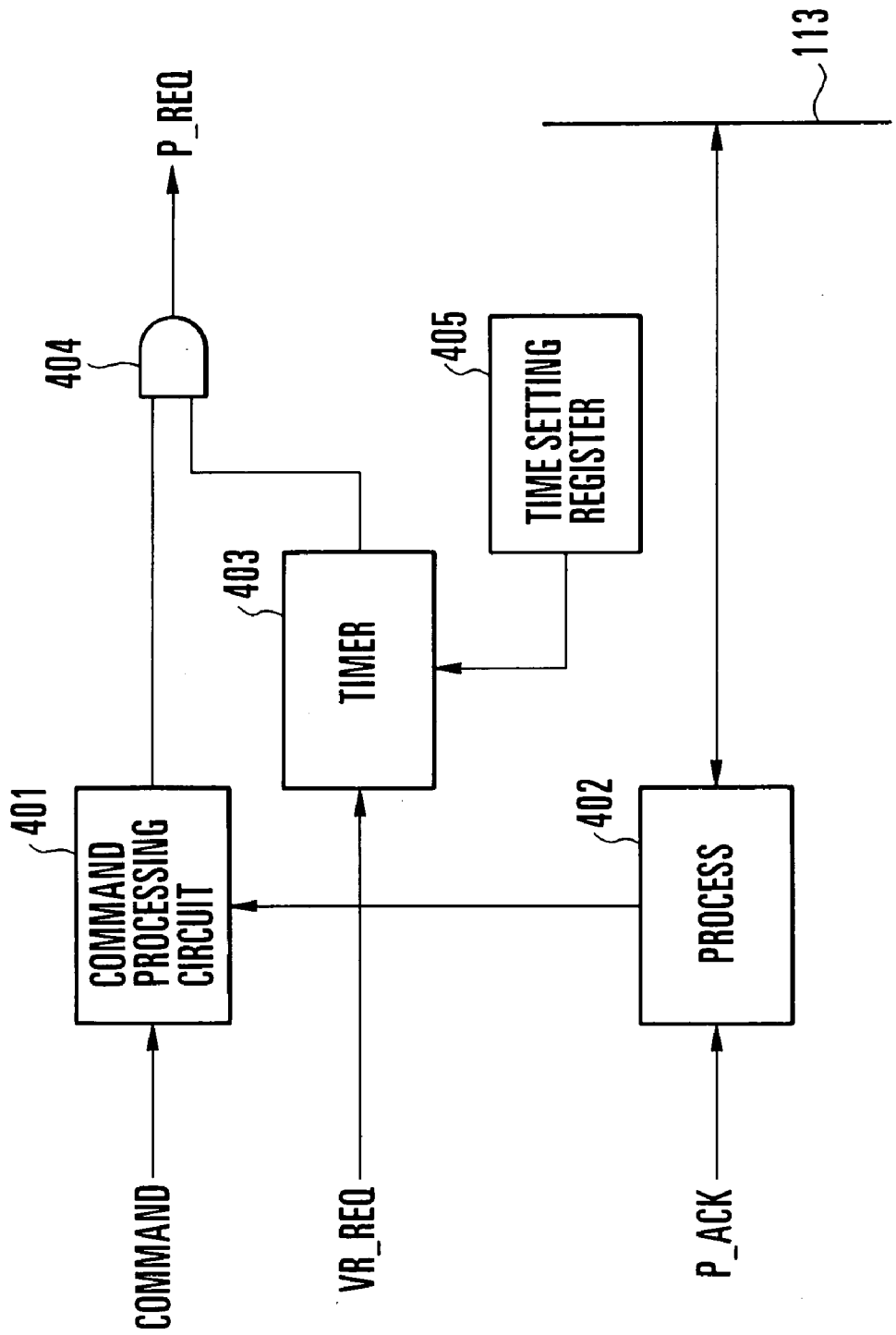
FIG. 4 is a block diagram showing the essential portion of a second type of process circuit incorporated in the electronic camera shown in FIG. 2.

The process circuit of the type B shown in FIG. 4 will be described below. When a command processing circuit 401 receives a process start command from the CPU 102, the command processing circuit 401 outputs a signal of "0". In the meantime, when a timer 403 receives a signal VR_REQ indicative of "1", the timer 403 is reset and starts counting a predetermined time period. While the timer 403 is performing a counting operation, the timer 403 outputs a signal of "0"; otherwise, the timer 403 outputs a signal of "1". The output of the command processing circuit 401 and the output of the timer 403 are ANDed by an AND circuit 404, and the obtained logical product is outputted as a process request signal P_REQ. Thus, the process circuit of the type B, when it receives a start command, outputs the process request signal P_REQ indicative of "1", but if the process circuit receives a signal of "1" at the terminal VR_REQ (to be described later) which interlocks with a refresh request, the process circuit of the type B outputs a process request signal P_REQ indicative of "0" during a predetermined time period which corresponds to a value written into a time setting register 405 by the CPU 102.

So long as the output of the timer 403 is not "0", when the command processing circuit 401 receives a process start command from the CPU 102, the process circuit of this type B generates a process request signal P_REQ indicative of "1". This signal P_REQ passes through the OR circuit 112 and is inputted into the DRAM bus arbitrating circuit 101. When the DRAM bus arbitrating circuit 101 receives the process request signal P_REQ indicative of "1", the DRAM bus arbitrating circuit 101 requests a refresh or a CPU access to release an access right to the DRAM bus 113. If neither the refresh nor the CPU access has occurred, the DRAM bus arbitrating circuit 101 directly proceeds to the next step.

If the DRAM bus 113 is released, the DRAM bus arbitrating circuit 101 gives a DRAM bus use right to a process circuit 402 and then generates a signal P_ACK indicative of "1" which means that the DRAM bus use right is given to the process circuit 402. When the refresh timing counter 105 which will be described later outputs a signal of "1" to the refresh holding counter 114, the refresh holding counter 114 receive this signal indicative of "1" and outputs a signal R_REQ indicative of "1". As will be described later, when the refresh timing counter 105 outputs the signal of "1", the timer 403 is reset, and starts a counting operation and outputs a signal of "0". Accordingly, the process request signal P_REQ is reset to "0", and the process circuit 402 temporarily stops.

When the DRAM bus arbitrating circuit 101 determines that the signal R_REQ is "1" and the signal P_REQ is "0", the DRAM bus arbitrating circuit 101 gives the DRAM bus use right to refresh processing and then outputs a refresh instruction signal to the refresh signal generating circuit 106. The refresh signal generating circuit 106 outputs a refresh signal to the DRAM bus 113 and refreshes the DRAM 103.

Even after the refresh of the DRAM 103 has been completed, the timer 403 continues to output a signal of "0" until a predetermined time period elapses. Accordingly, the process request signal P_REQ remains "0". During this time, the DRAM bus 113 remains released. Accordingly, the CPU 102 is allowed to operate while using the DRAM bus 113.

When the timer 403 counts up the predetermined time period, the process request signal P_REQ is again set to "1". When the process circuit receives a signal P_ACK indicative of "1", the process circuit restarts its process. If the process circuit completes its process operation, the command processing circuit 401 outputs a signal of "0" so that the process request signal P_REQ is reset to "0".

Each of the image compressing/expanding circuit 109, the vertical addition mixing circuit 110 and the image processing circuit 111 has a comparatively long processing time period and can be arranged so that even if its processing is interrupted at an intermediate step, the result of the processing is not affected by such interruption. For this reason, each of the circuits 109, 110 and 111 is arranged as the process circuit of the type B. The set value of the time setting register 405 in each of the circuits 109, 110 and 111 will be described later.

The refresh operation will be described below. By way of example, it is assumed that the DRAM 103 used in the present embodiment needs to be refreshed by 1,024 times for 128 msec. Referring to FIG. 2, the refresh timing counter 105 generates one pulse at intervals of 125 μsec. The refresh holding counter 114 is an up/down counter capable of counting up to 16. When the refresh holding counter 114 receives one pulse from the refresh timing counter 105, the refresh holding counter 114 increments its count value by one, and if the DRAM 103 is refreshed once, the refresh holding counter 114 decrements the count value by one. When the count value is not less than "1", the refresh holding counter 114 outputs a signal R_REQ indicative of "1".

In addition, the DRAM bus arbitrating circuit 101 is arranged to output a signal R_ACK indicative of "1" to the refresh signal generating circuit 106 when the count value of the refresh holding counter 114 is not less than "1" and the DRAM bus 113 is not occupied by another process. The operation of outputting the signal R_ACK indicative of "1" is repeated until the count value of the refresh holding counter 114 reaches "0".

Thus, such refresh is performed once per 125 μsec, but even if the DRAM bus 113 is occupied for a time period longer than 125 μsec by the process circuit of the type A, the refresh is performed once per 125 μsec as long as the time period is shorter than 2,000 μsec (=125 μsec×16). This time period is sufficiently long if one horizontal synchronizing period of an image pickup or display operation is 85 μsec. Thus, the prescribed condition of the DRAM 103, i.e., 1,024 refreshes per 128 msec, is satisfied, and the system of the digital electronic camera can operate stably.

Assuming that the DRAM 103 needs to be refreshed by 1,024 time for 16.4 msec, the pulse generation period of the refresh timing counter 105 needs to be 16 μsec. Thus, 1,024 refreshes per 16.4 msec are achieved.

It is assumed here that one horizontal synchronizing period of an image pickup or display operation is 85 μsec. The upper limit of the refresh holding counter 114 needs to be determined to satisfy:

$$z > x/y, \qquad (1)$$

where x represents the horizontal synchronizing period, y represents the pulse generation period of the refresh timing counter 105, and z represents the upper limit of the refresh holding counter 114. If the upper limit of the refresh holding counter 114 is selected to be "16", the maximum occupation time period of the DRAM bus 113 becomes 256 μsec. Since this time period is sufficiently longer than the horizontal synchronizing period, the system can operate stably.

A CPU access operation will be described below. The CPU 102 has an input terminal HOLDRQ and an output terminal HOLDAK. If a signal of "1" is inputted to the input terminal HOLDRQ, the CPU 102 temporarily stops its operation, and outputs a signal of "1" at the output terminal HOLDAK to indicate that the CPU 102 has stopped the operation. Then, if a signal of "0" is inputted to the input terminal HOLDRQ, the CPU 102 outputs a signal of "0" at the output terminal HOLDAK and restarts the operation. A signal line HOLDRQ of the DRAM bus arbitrating circuit 101 is connected to the input terminal HOLDRQ of the CPU 102. Before a process or a refresh is started, the DRAM bus arbitrating circuit 101 outputs a signal of "1" to the input terminal HOLDRQ of the CPU 102 and temporarily stops the CPU 102. If neither the process nor the refresh needs to be performed, the DRAM bus arbitrating circuit 101 outputs a signal of "0" to the input terminal HOLDRQ and enables the CPU 102 to perform the operation.

Figure 5:
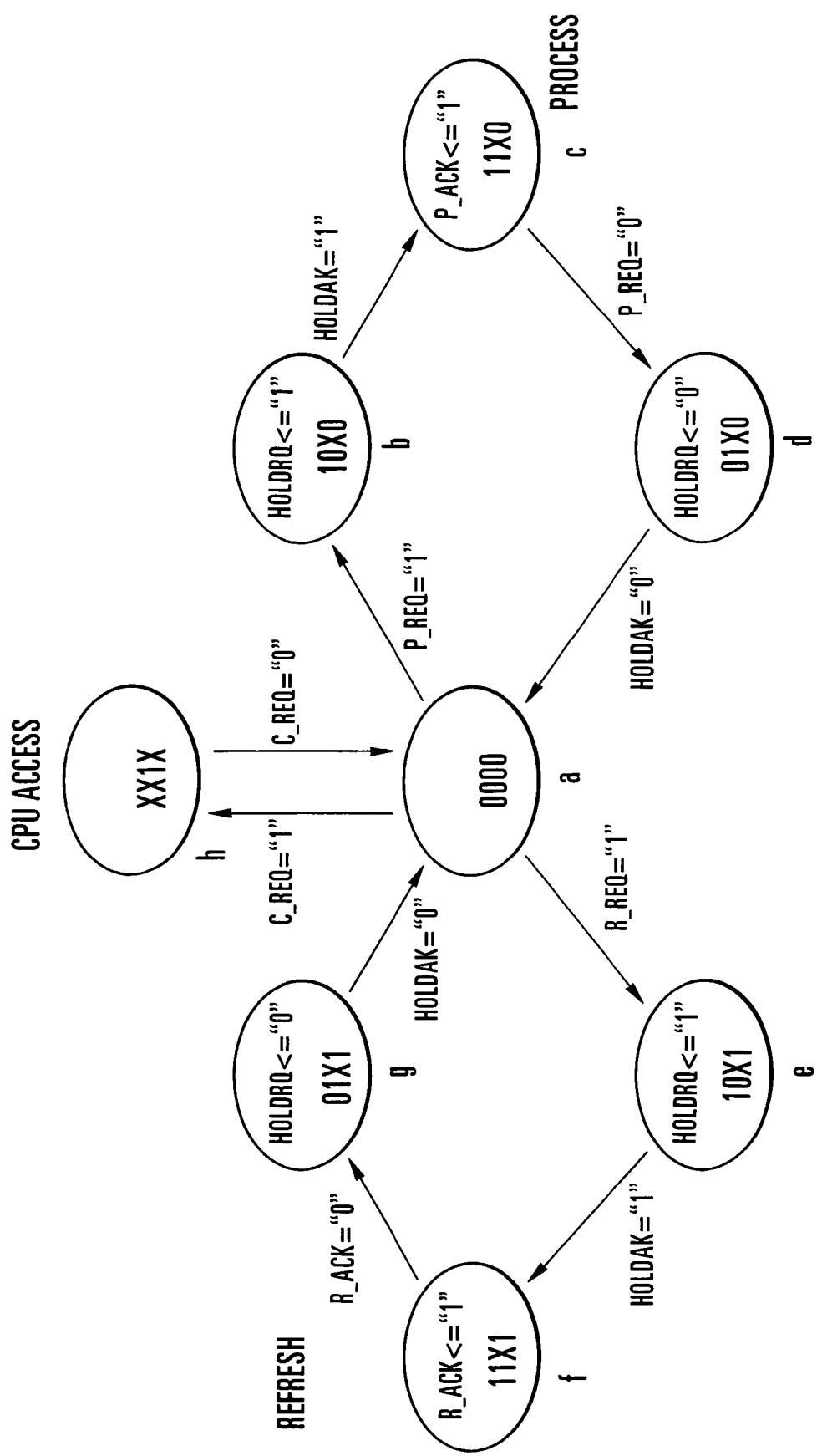
FIG. 5 is a diagram showing the state transition of a bus arbitrating circuit in the electronic camera shown in FIG. 2.

The DRAM bus arbitrating circuit 101 which is responsible for the above-described control will be described below. FIG. 5 is a state transition diagram showing the internal state transition of the DRAM bus arbitrating circuit 101. The DRAM bus arbitrating circuit 101 is arranged to start any of a refresh, a CPU access and a process in a state "a", and bring them to an end in the state "a".

First of all, the state transition of the DRAM bus arbitrating circuit 101 during the process operation will be described below. The DRAM bus arbitrating circuit 101, when it is idle, is in the state "a" shown in FIG. 5. If the process circuit receives a command and a process request signal P_REQ indicative of "1" is outputted to the DRAM bus arbitrating circuit 101, the DRAM bus arbitrating circuit 101 transitions to a state "b". In the state "b", the DRAM bus arbitrating circuit 101 outputs a signal of "1" to the input terminal HOLDRQ of the CPU 102. When the CPU 102 receives the signal of "1", the CPU 102 temporarily stops the operation and outputs a signal of "1" at the output terminal HOLDAK. When the DRAM bus arbitrating circuit 101 receives the signal of "1", the DRAM bus arbitrating circuit 101 transitions to a state "c" and outputs a signal P_ACK indicative of "1". The process circuit receives this signal P_ACK and starts its process processing. When the process circuit completes the process processing, a process request signal P_REQ indicative of "0" is outputted to the DRAM bus arbitrating circuit 101. In response to this signal P_REQ, the DRAM bus arbitrating circuit 101 transitions to a state "d". In the state "d", the DRAM bus arbitrating circuit 101 outputs a signal of "0" to the input terminal HOLDRQ of the CPU 102. When the CPU 102 receives this signal, the CPU 102 outputs a signal of "0" at the output terminal HOLDAK and restarts the processing. When the DRAM bus arbitrating circuit 101 receives this signal, the DRAM bus arbitrating circuit 101 transitions to the state "a".

The state transition of the DRAM bus arbitrating circuit 101 during refresh will be described below. When in the state "a", the DRAM bus arbitrating circuit 101 is in an idle state. If a refresh request signal R_REQ indicative of "1" is outputted to the DRAM bus arbitrating circuit 101 during the idle state, the DRAM bus arbitrating circuit 101 receives the refresh request signal R_REQ and transitions to a state "e". When in the state "e", the DRAM bus arbitrating circuit 101 outputs a signal of "1" to the input terminal HOLDRQ of the CPU 102. When the CPU 102 receives this signal, the CPU 102 temporarily stops the operation and outputs a signal of "1" at the output terminal HOLDAK. When the DRAM bus arbitrating circuit 101 receives the signal of "1", the DRAM bus arbitrating circuit 101 transitions to a state "f" and outputs a signal R_ACK indicative of "1".

When the refresh signal generating circuit 106 receives the signal R_ACK indicative of "1", the refresh signal generating circuit 106 outputs a refresh pulse for one refresh cycle to the DRAM bus 113 and refreshes the DRAM 103. When one cycle of refresh is completed, the DRAM bus arbitrating circuit 101 outputs a signal R_ACK indicative of "0" and, at the same time, the count value of the refresh holding counter 114 is decremented by one. Thus, the DRAM bus arbitrating circuit 101 transitions to a state "g". When in the state "g", the DRAM bus arbitrating circuit 101 outputs a signal of "0" to the input terminal HOLDRQ of the CPU 102. In response to this signal, the CPU 102 restarts the operation and outputs a signal of "0" at the output terminal HOLDAK. Thus, the DRAM bus arbitrating circuit 101 transitions to the state "a" and completes the refresh operation. At this time, if the count value of the refresh holding counter 114 is not "0", it indicates that a signal R_REQ indicative of "0" has been outputted from the DRAM bus arbitrating circuit 101, so that the above-described refresh state transition cycle is again executed.

The operation of the DRAM bus arbitrating circuit 101 during CPU access will be described below. When the DRAM bus arbitrating circuit 101 is in the state "a", the CPU 102 can access the DRAM 103. If the CPU 102 accesses the DRAM 103, the DRAM access circuit 104 outputs a signal C_REQ indicative of "1" to the DRAM bus arbitrating circuit 101. When the DRAM bus arbitrating circuit 101 receives the signal C_REQ, the DRAM bus arbitrating circuit 101 transitions to a state "h". Accordingly, during the CPU access, neither a process nor a refresh is activated. When the CPU access is completed, the DRAM access circuit 104 outputs a signal C_REQ indicative of "1" to the DRAM bus arbitrating circuit 101. When the DRAM bus arbitrating circuit 101 receives the signal C_REQ, the DRAM bus arbitrating circuit 101 transitions to the state "a" and returns to the idle state.

The above-described operations are summarized below. During the operation of the image pickup circuit 107, while the image pickup circuit 107 is reading one line of image data from a CCD (not shown), the image pickup circuit 107 uses the DRAM bus 113 with the highest priority. Similarly, during the operation of the image display circuit 108, while the image display circuit 108 is outputting one line of image data to a monitor (not shown), the image display circuit 108 uses the DRAM bus 113 with the highest priority. During the blanking periods of an image pickup or display operation, refresh is performed with priority during the first time period, and the CPU 102 accesses the DRAM 103 during the remaining time period.

During the operation of each of the image compressing/expanding circuit 109, the vertical addition mixing circuit 110 and the image processing circuit 111, refresh is performed in preference to their operation. It is to be noted that a time period elapses until these circuits set the process request signal P_REQ to "1" after the refresh, the time period being equivalent to the difference between the time period set in the time setting register 405 and the time period actually required for the refresh. During such time period, the CPU 102 can access the DRAM 103.

The set value of the time setting register 405 for each of processes to be executed by the image compressing/expanding circuit 109, the vertical addition mixing circuit 110 and the image processing circuit 111 will be described below. By optimizing the set value of the time setting register 405 for each of the circuits 109, 110 and 110, it is possible to optimize the proportion of the operation-enabled time period of each of the circuits 109, 110 and 110 to the operation-enabled time period of the CPU 102.

In the present embodiment, a set value to be written into the time setting register 405 in the vertical addition mixing circuit 110 is selected to be smaller than those to be written into the respective time setting registers 405 of the other circuits 109 and 111. This is because, at the time of vertical addition mixing processing, the CPU 102 needs only to detect whether vertical addition mixing processing has been completed, and the aforesaid set value may be a required minimum value.

However, during image compressing/expanding processing, if characters such as "COMPRESSING" are to be displayed on a display panel (not shown), the set value for the image compressing/expanding circuit 109 needs to be made larger than that for the vertical addition mixing circuit 110 so that the CPU 102 can optimally perform the operation of displaying such characters.

In the case of the image processing circuit 111 as well, the set value of the time setting register 405 may be adjusted in a similar manner. However, if the set value of the time setting register 405 of the image processing circuit 111 is made larger, the average speed of the process of the image processing circuit 111 becomes slower; whereas if the set value is made smaller, the average speed of the process becomes faster. In the present embodiment, characters such as those formed by the CPU 102 are displayed on the display panel during the operation of the image compressing/expanding circuit 109, and the CPU 102 participates in the setting of the processing contents or the like of the image processing circuit 111. Therefore, the respective set values of the time setting registers 405 of the circuits 109, 110 and 111 are made larger in the order of the circuit 109, the circuit 111 and the circuit 110.

An additional description will be given in connection with the image compressing/expanding circuit 109. The image display circuit 108 outputs a signal of "0" when it is not performing an image display operation or during the blanking periods of the image display operation. This signal is applied to one input terminal of the OR circuit 115. The output of the refresh timing counter 105 is applied to the other input terminal of the OR circuit 115. The output of the OR circuit 115 is connected to an input VR_REQ of the image compressing/expanding circuit 109.

In this arrangement, when the image display circuit 108 is not in operation, the image compressing/expanding circuit 109 is allowed to operate when no refresh is needed; whereas when the image display circuit 108 is in operation, the image compressing/expanding circuit 109 is allowed to operate only when no refresh request takes place during the blanking periods of an image display operation. Accordingly, it is possible to realize time-division parallel processing of an image display operation and image compressing/expanding processing. If this time-division parallel processing is used, it is possible to smoothly rewrite an image currently displayed on the screen of a monitor with the next different image without stopping the operation of displaying an image on the monitor. As a matter of course, when the image display circuit 108 is not performing an image display operation, the image compressing/expanding circuit 109 operates as a normal process circuit of the type B. Such an arrangement is also useful for the image processing circuit 111 because the arrangement enables the image processing circuit 111 to perform processing, such as a variation in the size of an image or a rotation of the image on the screen of the monitor, while displaying the image.

According to the present embodiment, in an image pickup or display operation, refresh is performed during only each blanking period so that there is no possibility that an interruption occurs in the image pickup or display operation during one line period. In addition, it is possible to realize time-division processing of both a process which requires a comparatively long processing time period, such as image compression/expansion, vertical addition mixing or image processing, and the access of the CPU 102 to the DRAM 103. This feature enables, for example, the function of blinking a display such as "COMPRESSING" on the monitor during the compression of an image. Furthermore, since the DRAM 103 is refreshed by an optimum number of times, power consumption due to refresh can be minimized and the interruption of the aforesaid processing can be minimized to reduce the entire processing time. Accordingly, it is possible to provide a digital electronic camera of good operability.

In addition, the image display circuit 108 and the image pickup circuit 107 as well as the image display circuit 108 and the image processing circuit 111 can be operated apparently at the same time in a time-division manner, whereby it is possible to realize processing such as the rewriting of data on the monitor or the rotation of an image on the monitor during the display of the image on the monitor.

Furthermore, since no refresh timing is obtained from the image pickup circuit 107, the supply of power to the image pickup circuit 107 can be stopped if no image pickup operation needs to be performed, whereby it is possible to realize a further decrease in power consumption.

As is apparent from the foregoing description, according to the present embodiment, since various kinds of image processing are divided into first processing which can be performed with priority and second processing over which refresh takes priority, it is possible to appropriately effect the various kinds of image processing by using a memory which needs refreshing, such as a DRAM, while reliably refreshing the memory.

Since the first processing is assigned the processing of storing picked-up image data and the processing of displaying the stored image data, it is possible to prevent an interruption in an image pickup or display operation.

Since the second processing is assigned processing which requires a comparatively long processing time period, for example, compression/expansion of image data, vertical addition and size change, such processing can be performed in a time-division manner, whereby it is possible to provide display during the processing. In addition, since refresh is performed by an optimum number of times, power consumption can be reduced.

In addition, even in the first processing, it is possible to reliably effect refresh during the blanking periods of picked-up image data or display image data.

In addition, since it is possible to effect refresh during blanking periods or respond to a refresh request while performing compressing/expanding processing or image processing, it is possible to effect rewriting or processing of image data on the monitor while displaying an image on the monitor.

In addition, access to a memory by control means such as a CPU can be effected at appropriate timing during each processing.

In addition, since refresh is performed with a counter whose count value increments by one for a predetermined time period and decrements by one for each refresh, it is possible to reliably effect refresh within a required time period.

In other words, in accordance with the present embodiment, since an image pickup or display operation is performed without interruption, an image pickup operation can be completed in a shortest image pickup time period and a high-quality display screen free of noise can be achieved.

Since both a process which requires a comparatively long processing time period, such as image compression/expansion, vertical addition mixing or image processing, and access to a DRAM by a CPU can be executed by time-division processing, it is possible to realize the function of blinking a display such as "COMPRESSING" on the monitor during, for example, the compression of an image.

Power consumption due to refresh can be minimized, and the supply of power to an image pickup circuit can be stopped, whereby it is possible to realize a further decrease in power consumption.

In addition, it is possible to realize processing such as the rewriting of data on the monitor or the rotation of an image on the monitor during the display of the image on the monitor.

As is apparent from the above description, it is possible to provide an apparatus such as a digital electronic camera of good operability.

Furthermore, since the operating time of the CPU is optimally set for each image processing circuit, the average processing time period of each image processing circuit can be reduced, and it is possible to optimize the processing time period of each image processing circuit according to whether the CPU needs to create display data.

The invention claimed is:

1. An image capture apparatus comprising:
   an image capture unit adapted to capture image data;
   a memory adapted to store the image data captured by the image capture unit;
   an image compression unit adapted to compress the image data stored in the memory;
   an image display unit adapted to display an image using the image data stored in the memory;
   a control unit adapted to control the image capture apparatus;
   a refresh control unit adapted to refresh the memory; and
   an arbitration unit adapted (a) to assign a higher priority to a process of providing image data from the image capture unit to the memory than a process of refreshing the memory and a process of accessing the memory by the control unit, (b) to assign a higher priority to a process of refreshing the memory and a process of accessing the memory by the control unit than a process of compressing image data stored in the memory by the image compression unit, (c) to assign a higher priority to a process of providing image data from the memory to the image display unit than a process of refreshing the memory and a process of accessing the memory by the control unit, and (d) to assign a higher priority to a process of refreshing the memory than a process of accessing the memory by the control unit.

2. An image capture apparatus according to claim 1, wherein the image capture apparatus is an electronic camera.

3. An image capture apparatus according to claim 1, wherein in a blanking period, the arbitration unit enables a process of refreshing the memory.

4. An image capture apparatus comprising:
   an image capture unit adapted to capture image data;
   a memory adapted to store the image data captured by the image capture unit;
   an image processing unit adapted to rotate the image data stored in the memory;
   an image display unit adapted to display an image using the image data stored in the memory;
   a control unit adapted to control the image capture apparatus;
   a refresh control unit adapted to refresh the memory; and
   an arbitration unit adapted (a) to assign a higher priority to a process of providing image data from the image capture unit to the memory than a process of refreshing the memory and a process of accessing the memory by the control unit, (b) to assign a higher priority to a process of refreshing the memory and a process of accessing the memory by the control unit than a process of rotating image data stored in the memory by the image processing unit, (c) to assign a higher priority to a process of providing image data from the memory to the image display unit than a process of refreshing the memory and a process of accessing the memory by the control unit, and (d) to assign a higher priority to a process of refreshing the memory than a process of accessing the memory by the control unit.

5. An image capture apparatus according to claim 4, wherein the image capture apparatus is an electronic camera.

6. An image capture apparatus according to claim 4, wherein in a blanking period, the arbitration unit enables a process of refreshing the memory.

7. An image capture apparatus comprising:
   an image capture unit to capture the image data;
   a memory adapted to store the image data captured by the image capture unit;
   an image processing unit adapted to change an image size of the image data stored in the memory;
   an image display unit adapted to display an image using the image data stored in the memory;
   a control unit adapted to control the image capture apparatus;
   a refresh control unit adapted to refresh the memory; and
   an arbitration unit adapted (a) to assign a higher priority to a process of providing image data from the image capture unit to the memory than a process of refreshing the memory and a process of accessing the memory by the control unit, (b) to assign a higher priority to a process of refreshing the memory and a process of accessing the memory by the control unit than a process of changing an image size of image data stored in the memory by the image processing unit, (c) to assign a higher priority to a process of providing image data from the memory to the image display unit than a process of refreshing the memory and a process of accessing the memory by the control unit, and (d) to assign a higher priority to a process of refreshing the memory than a process of accessing the memory by the control unit.

8. An image capture apparatus according to claim 7, wherein the image capture apparatus is an electronic camera.

9. An image capture apparatus according to claim 7, wherein in a blanking period, the arbitration unit enables a process of refreshing the memory.

* * * * *